(12) United States Patent
Kosanovich et al.

(10) Patent No.: US 12,478,196 B1
(45) Date of Patent: Nov. 25, 2025

(54) CONFECTIONS DISPENSING SYSTEM AND METHOD

(71) Applicant: Breakaway Systems LLC, Westerville, OH (US)

(72) Inventors: Nick Kosanovich, Westerville, OH (US); Ralph Denisco, Sugarcreek Township, OH (US)

( * ) Notice: Subject to any disclaimer, the term of this patent is extended or adjusted under 35 U.S.C. 154(b) by 401 days.

(21) Appl. No.: 18/115,608

(22) Filed: Feb. 28, 2023

Related U.S. Application Data

(63) Continuation-in-part of application No. 17/677,091, filed on Feb. 22, 2022, now abandoned.

(60) Provisional application No. 63/153,474, filed on Feb. 25, 2021.

(51) Int. Cl.
| | |
|---|---|
| *A47F 10/02* | (2006.01) |
| *B65D 35/10* | (2006.01) |
| *B65D 35/12* | (2006.01) |

(52) U.S. Cl.
CPC .............. *A47F 10/02* (2013.01); *B65D 35/10* (2013.01); *B65D 35/12* (2013.01); *B65D 2231/001* (2013.01); *B65D 2231/027* (2013.01)

(58) Field of Classification Search
CPC ... A47F 10/02; B67D 7/0216; B65D 33/2508; B65D 75/5883; A23G 9/28
See application file for complete search history.

(56) References Cited

U.S. PATENT DOCUMENTS

| | | | | |
|---|---|---|---|---|
| 5,957,334 | A * | 9/1999 | Rosario | B65D 35/285 |
| | | | | 222/102 |
| 7,815,954 | B2 * | 10/2010 | Miller | A23G 9/225 |
| | | | | 426/515 |
| 2002/0092879 | A1 * | 7/2002 | Chrisman | B67D 7/0216 |
| | | | | 222/504 |
| 2014/0008390 | A1 * | 1/2014 | Burke | B67D 7/0216 |
| | | | | 222/101 |
| 2019/0053515 | A1 * | 2/2019 | Stojkovski | A23G 9/28 |
| 2019/0142028 | A1 * | 5/2019 | Arao | B65D 85/78 |
| | | | | 222/95 |

OTHER PUBLICATIONS

DE60123228 and machine translation (Year: 2025).*
WO2007108136 and machine translation (Year: 2025).*

* cited by examiner

*Primary Examiner* — Timothy P. Kelly
(74) *Attorney, Agent, or Firm* — Ronald J Koch; THE ELEY LAW FIRM

(57) ABSTRACT

A system and method of dispensing a confection material from a flexible pouch. A user selects a pouch at a point of sale and inserts the pouch into a machine which squeezes the contents of the pouch into a cup or cone, etc.

6 Claims, 28 Drawing Sheets

| | |
|---|---|
| 200 | A user selects the confections pouch 120 of claim XXX |
| 201 | the user selects a cone 123 |
| 202 | the user moves the handle 114 of the confections dispenser 100 of claim XXX from a closed position to a first open position |
| 203 | the user places the selected cone 123 into the cone holder 116 of the confections dispenser 100 |
| 204 | the user lifts the handle 114 thereby moving first and second access doors 104, 106 to a second open position |
| 205 | the user places the selected confections pouch 120 into nest assembly 150 |
| 206 | the user moves the handle 114 of the confections dispenser 100 from the second open position to the closed position |
| 207 | the user pushes actuation button 112 of the confections dispenser 100 |
| 208 | first and second grippers 151, 152 are closed to operatively grip or restrain fitment 124 |
| 209 | pinch roller assembly 140 moves downwardly from a starting position, by a pre-defined distance towards pouch |
| 210 | cone holder 116 moves upwardly along cone transport mechanism 117 towards pouch 120 |
| 211 | pouch grippers 142 are closed at a pre-defined position so as to grip upper edge 137 of pouch 120, prior to pinch roller assembly engaging pouch 120 |
| 212 | pinch roller assembly 140 grips an upper edge 137 of pouch 120, the pinch rollers being rotated in a forward direction, so as to cause the pinch roller to be downwardly urged relative to pouch 120, as confections material 131 is gradually squeezed out of opening 122 |
| 213 | pouch grippers 142 are opened to release pouch 120 |
| 214 | cone holder 116 moves downwardly along cone transport mechanism 117 away from pouch 120 at a speed commensorate with the discharge of confections material |
| 215 | pinch roller assembly 140 ceases downward movement at a stopping position, when the pinch rollers reach the bottom of the pouch, just above fitment 124 |
| 216 | pinch rollers cease forward rotation |
| 217 | pinch roller assembly 140 moves upwardly to return to the starting position |
| 218 | disposal chute 138 is moved from a retracted position to an extended position, underneath pouch 120 |
| 219 | pinch rollers begin backward rotation to discharge pouch 120 from pinch rollers into the disposal chute 138 |
| 219 | disposal chute 138 is moved to a storage position |

FIG. 20

|  | Heavy Duty (48-60-130 formerly 48-60-5) | | |
| --- | --- | --- | --- |
|  | PET | BON | PE |
| Gauge | 48 | 60 | 130 |
| Mils | 0.48 | 0.6 | 5 |
| Microns | 12.2 | 15.24 | 127 |
| Inches | 0.00048 | 0.0006 | 0.005 |
| Total Thickness | 0.0061 inches | | |

FIG. 21

| Heavy Duty Pouches | | | | 48 PET - 60 BON - 130 PE (formerly 48-60-5) | | |
|---|---|---|---|---|---|---|
| Spec. # | Temp °F | Time sec. | Torque % | Outcome | Faults | Comments |
| 29 | 1 | 15 | 12.5 | Good | 1 rib @ 2 place | Good Product Consistency |
| 30 | 1 | 15 | 12.5 | Good | None | Good Product Consistency |
| 31 | -1 | 9 fail 13 finish | 12.5 | Fail | 3 ribs 1 place Ripped along fitment top rib | Very Messy |
| 32 | 0 | 14 | 12.5 | Good | 3 ribs 1 place | Good Product Consistency |
| 33 | 0 | 8 fail 12 finish | 12.5 | Fail | 3 ribs 1 place Ripped along fitment top rib and corner | Very Messy |
| 34 | 1 | 7 fail 13 finish | 12.5 | Fail | Ripped along fitment top edge | Very Messy |

FIG. 22

|  | Extra Heavy Duty (48-1-4.5) | | |
| --- | --- | --- | --- |
|  | PET | BON | PE |
| Gauge | 48 | 100 | 450 |
| Mils | 0.48 | 1 | 4.5 |
| Microns | 12.2 | 25.4 | 114.3 |
| Inches | 0.00048 | 0.001 | 0.0045 |
| Total Thickness | 0.0060 inches | | |

FIG. 23

| Extra HD Pouches | | | | 48 PET - 1 BON - 4.5 PE | | |
|---|---|---|---|---|---|---|
| Spec. # | Temp °F | Time sec. | Torque % | Outcome | Faults | Comments |
| 15 | 1 | 14 | 12.5 | Good | 1 rib @ 1 place | Good Product Consistency |
| 16 | -1 | 11 | 12.5 | Fail | 3 ribs fail & rip open Blow-out side seam @ 9 seconds | Very Messy |
| 17 | 0 | 16 | 12.5 | Good | 2 ribs @ 1 place | Good Product Consistency |
| 18 | 0 | 18 | 12.5 | Good | 2 ribs @ 1 place | Good Product Consistency |
| 19 | -2 | 20 | 12.5 | Good | 3 ribs @ 1 place | Good Product Consistency |
| 20 | 1 | 12 | 12.5 | Good | 3 ribs @ 1 place | Good Product Consistency |
| 21 | 1 | 14 | 12.5 | Good | None | Good Product Consistency |
| 22 | 0 | 16 | 12.5 | Good | 2 ribs @ 1 place | Good Product Consistency |
| 23 | 0 | 14 | 12.5 | Good | 3 ribs @ 1 place 1 rib @ 1 place | Good Product Consistency |

FIG. 24

| | Super Heavy Duty (48-1-5) | | |
|---|---|---|---|
| | PET | BON | PA + PE |
| Gauge | 48 | 100 | 500 |
| Mils | 0.48 | 1 | 5 |
| Microns | 12.2 | 25.4 | 127 |
| Inches | 0.00048 | 0.001 | 0.005 |
| Total Thickness | 0.0065 inches | | |

FIG. 25

| Super Duty Pouches | | | | | 48 PET - 1 BON - 5 PA + PE | |
|---|---|---|---|---|---|---|
| Spec. | Temp | Time | Torque | Outcome | Faults | Comments |
| 14 | 1 | 14 | 12.5 | Good | 3 ribs @ 2 places Cap Popped Off at very end of stroke | Good Product Consistency |
| 24 | 1 | 15 | 12.5 | Good | 1 rib @ 1 place | Good Product Consistency |
| 25 | 0 | 15 | 12.5 | Good | 3 ribs @ 2 places | Good Product Consistency |
| 26 | 0 | 14 | 12.5 | Good | 3 ribs @ 1 place | Good Product Consistency |
| 27 | 0 | 16 | 12.5 | Good | 1 rib @ 1 place 1 rib @ 1 place | Good Product Consistency |
| 28 | 1 | 15 | 12.5 | Good | Cap Popped Off at very end of stroke | Good Product Consistency |

FIG. 26

| Super Duty Pouches | | | | | 48 PET - 1 BON - 5 PA + PE | |
|---|---|---|---|---|---|---|
| Spec. # | Temp °F | Time sec. | Torque % | Outcome | Faults | Comments |
| 4 | 7 | 9 | 16 | Good | none | Product very soft |
| 5 | 7 | 6 | - | Good | No video | Product very soft |
| 6 | 7 | 6 | - | Good | none | Product very soft |
| 7 | 1 | 6 | 13.7 | Good | 4 ribs @ 1 place 1 rib @ 2 places | Good Product Consistency |
| 8 | 1 | 6 | 16 | Fail | Side Wall Blown Out Top Rib Ripped Open | Very Messy |
| 9 | 4 | 7 | 14.2 | Good | 3 ribs @ 1 place | Good Product Consistency |
| 10 | 2 | 8 | 22.2 | Good | 3 ribs @ 1 place Small Corner Tear/Leak | Good Product Consistency Faults Invisible to customer |
| 11 | 3 | 8 | 15.5 | Fail | 3 ribs @ 1 place Large Corner Tear/Leak | Very Messy |
| 12 | 2 | 8 | 12 | Good | 1 rib @ 1 place | Good Product Consistency |
| 13 | 3 | 8 | 10 | Good | none | Good Product Consistency |

FIG. 27

| Spec. # | Temp °F | Time sec. | Lost Product fl. oz. |
|---|---|---|---|
| 15 | 1 | 14 | 1.04 |
| 17 | 0 | 16 | 1.01 |
| 18 | 0 | 18 | 1.13 |
| 19 | -2 | 20 | 1.33 |
| 20 | 1 | 12 | 1.12 |
| 21 | 1 | 14 | 1 |
| 22 | 0 | 16 | 1.14 |
| 23 | 0 | 14 | 1.13 |
| 24 | 1 | 15 | 1.17 |
| 25 | 0 | 15 | 1.09 |
| 26 | 0 | 14 | 1.03 |
| 27 | 0 | 16 | 1.05 |
| 28 | 1 | 15 | 1.02 |
| 29 | 1 | 15 | 0.95 |
| 30 | 1 | 15 | 1.02 |
| 32 | 0 | 14 | 1.04 |

FIG. 28

CONFECTIONS DISPENSING SYSTEM AND METHOD

FIELD

The subject technology relates generally to a confection dispensing system and method, and specifically to a self-service and operator-serve confection dispensing system and method which provides a single-serve container, pre-filed with confection material, for selection by a user to be dispensed into a receptacle for consumption.

BACKGROUND AND SUMMARY

The popularity of chilled confections served in the form of soft consistencies, such as soft serve ice cream, sherbet, custard or yogurt, continues to increase. Typically, these confections are available commercially from stores on site, which use blended mix reservoirs in bulk dispensing machines. The store staff controls the entire process, and regulates the dispensing by use of a flow control level or button at the outlet. The flowing material drops by gravity or by force feeding from the outlet to be captured into a receptacle below.

The large dispensing machines take up store space, and the bulk liquid material has a limited shelf life once inside the reservoir. As a result, stores typically only offer the standard two flavors of vanilla and chocolate. Staff is also required to be available to operate, clean and maintain the store machines. Typically, the bulk dispensing machines need to be taken apart to some degree at the end of each day in order to clean and sterilize parts that come into contact with the food product.

There remains a need for sealed, sanitary, single-serve containers of chilled confections that provide a wide variety of selection of flavors to the consumer to be available in a self-service dispensing system. The confection dispensing system of the subject technology eliminates the need for staff participation in the dispensing process as well as creating a new commercial and consumer market having a wider variety of flavors, at a lower cost to the operator and relatively smaller physical footprint/space. The subject self-serve confection dispensing system provides a novel interactive experience that allows the user to obtain the chilled flavor pouch of their choice and transfer it to a dispensing machine. The subject confection dispensing system also allows the user to choose the receptacle for receiving the dispensed confection material, and to retrieve the finished product for consumption. The subject confection dispensing system can be a stand-alone commercial vending type system, but can also be scaled down to a portable countertop residential system.

In one aspect of the subject technology, a confections dispenser (sometimes referred to as "unit") is a non-refrigerated ice cream dispenser intended for countertop use in a typical commercial retail environment. In one aspect, a user will be an untrained consumer in the case of a fully automated unit. Alternatively, a trained store employee trained to use the machine in the behind the counter configuration is possible. In one aspect, the dispenser will be factory configurable for either mode.

BRIEF DESCRIPTION OF THE DRAWINGS

FIG. 20 Depicts a flow diagram for a confections dispensing method in one aspect of the subject technology FIG. 21 Depicts a table depicting various pouch material parameters FIG. 22 Depicts a table depicting various pouch material parameters FIG. 23 Depicts a table depicting various pouch material parameters FIG. 24 Depicts a table depicting various pouch material parameters FIG. 25 Depicts a table depicting various pouch material parameters FIG. 26 Depicts a table depicting various pouch material parameters FIG. 27 Depicts a table depicting various pouch material parameters FIG. 28 Depicts a table depicting various pouch material parameters

REFERENCE NUMERALS IN DRAWINGS

Figure 1:
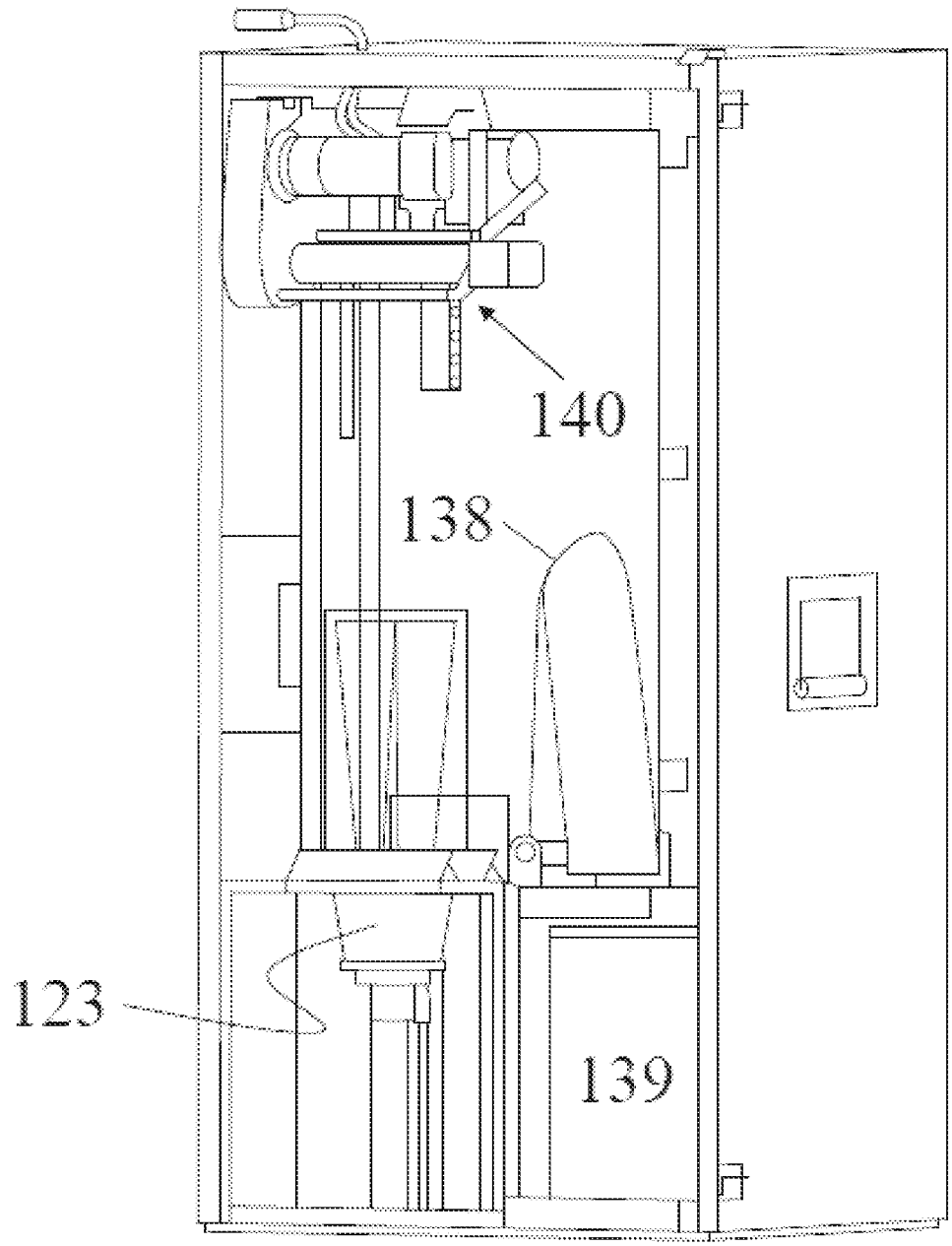
FIG. 1 Depicts a perspective view of a confections dispenser 100, in one aspect of the subject technology, with the front removed to allow viewing of internal components as viewed from a somewhat frontal perspective.

The table below lists the reference numerals employed in the figures, and identifies the element designated by each numeral.

- 100 confections dispenser 100
- 102 access port 102
- 103 upper portion 103 of access port 102
- 104 first access door 104
- 105 lower portion 105 of access port 102
- 106 second access door 106
- 108 front surface 108 of confections dispenser 100
- 109 display screen 109
- 112 actuation button 112 of confections dispenser 100
- 114 handle 114 of second access door 106
- 116 cone (aka cup) holder 116
- 117 cone transport mechanism 117
- 118 pouch receiver slot (between pinch rollers) 118
- 119 cap 119 of pouch 120
- 120 pouch 120
- 121 reservoir 121 of pouch 120
- 122 opening 122 of pouch 120
- 123 cone (or cup) 123 of pouch 120
- 124 fitment 124 of pouch 120
- 125 first inner layer 125 of pouch 120
- 126 second inner layer 126 of pouch 120
- 127 first intermediate layer 127 of pouch 120
- 128 second intermediate layer 128 of pouch 120
- 129 first outer layer 129 of pouch 120
- 130 second outer layer 130 of pouch 120
- 131 confections material 131 of pouch 120
- 132 seam 132 of pouch 120
- 133 centerline 133 of pouch 120
- 134 tapered sides 134 of pouch 120
- 135 bottom portion 135 of pouch 120
- 136 dispensing nozzle 136 of pouch 120
- 137 upper edge 137 of pouch 120
- 138 disposal chute 138
- 139 waste receptacle 139
- 140 pinch roller assembly 140
- 141 pinch roller 141
- 142 pouch grippers 142
- 143 outer surface 143 of pinch rollers 141
- 150 nest assembly 150
- 151 first gripper 151 of nest assembly 150
- 152 second gripper 152 of nest assembly 150
- 153 rails 153 of nest assembly 150
- 154 screw drive 154 of nest assembly 150
- 155 harness 155 of nest assembly 150
- 156 sensors 156 of nest assembly 150
- 157 bottom portion 157 of upper portion 103 of access port 102

DETAILED DESCRIPTION

In one aspect of the subject technology, a confections pouch 120 comprises: a reservoir 121 formed by first and second inner layers 125, 126, a fitment 124 disposed in a bottom portion 135 of pouch 120, the fitment 124 defining an opening 122 in reservoir 121 through which a confections material 131 is dispensed.

Figure 4:
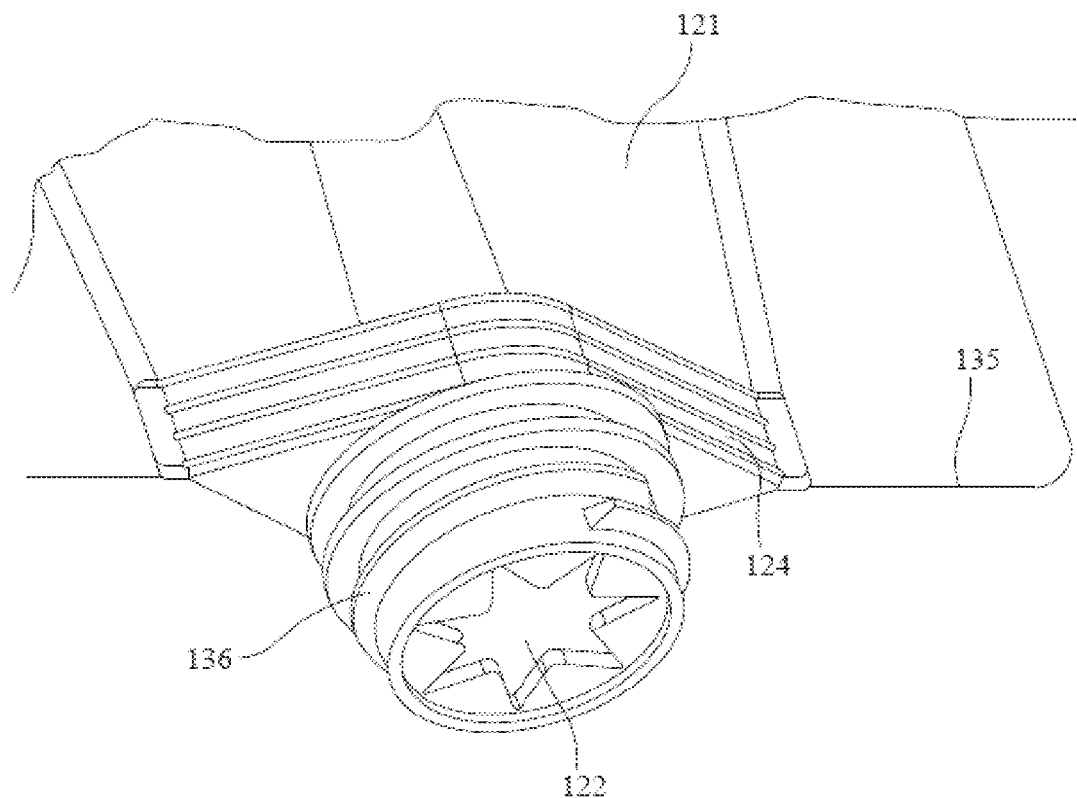
FIG. 4 depicts a fragmentary bottom perspective view of a portion of pouch 120 showing opening 122 in dispensing nozzle 136.
Figure 5:
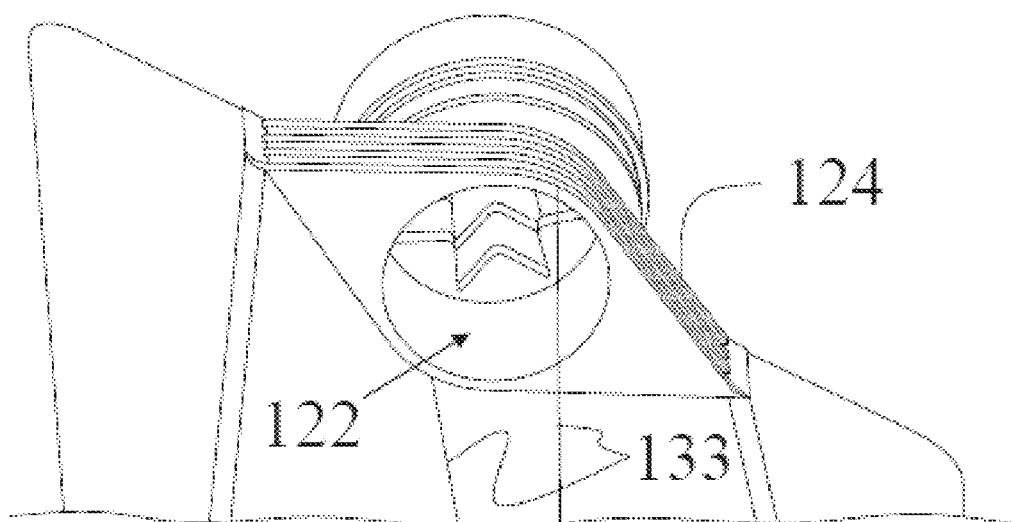
FIG. 5 depicts a fragmentary bottom perspective view of a portion of pouch 120 showing opening 122 in fitment 124.
Figure 6:
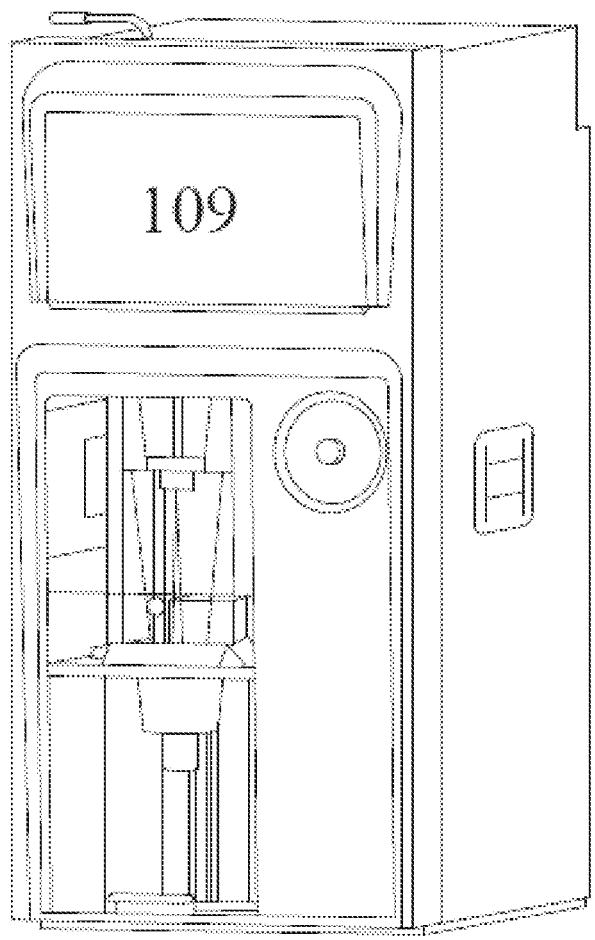
FIG. 6 Depicts a perspective view of confections dispenser 100, in one aspect of the subject technology, with display screen 109
Figure 7:
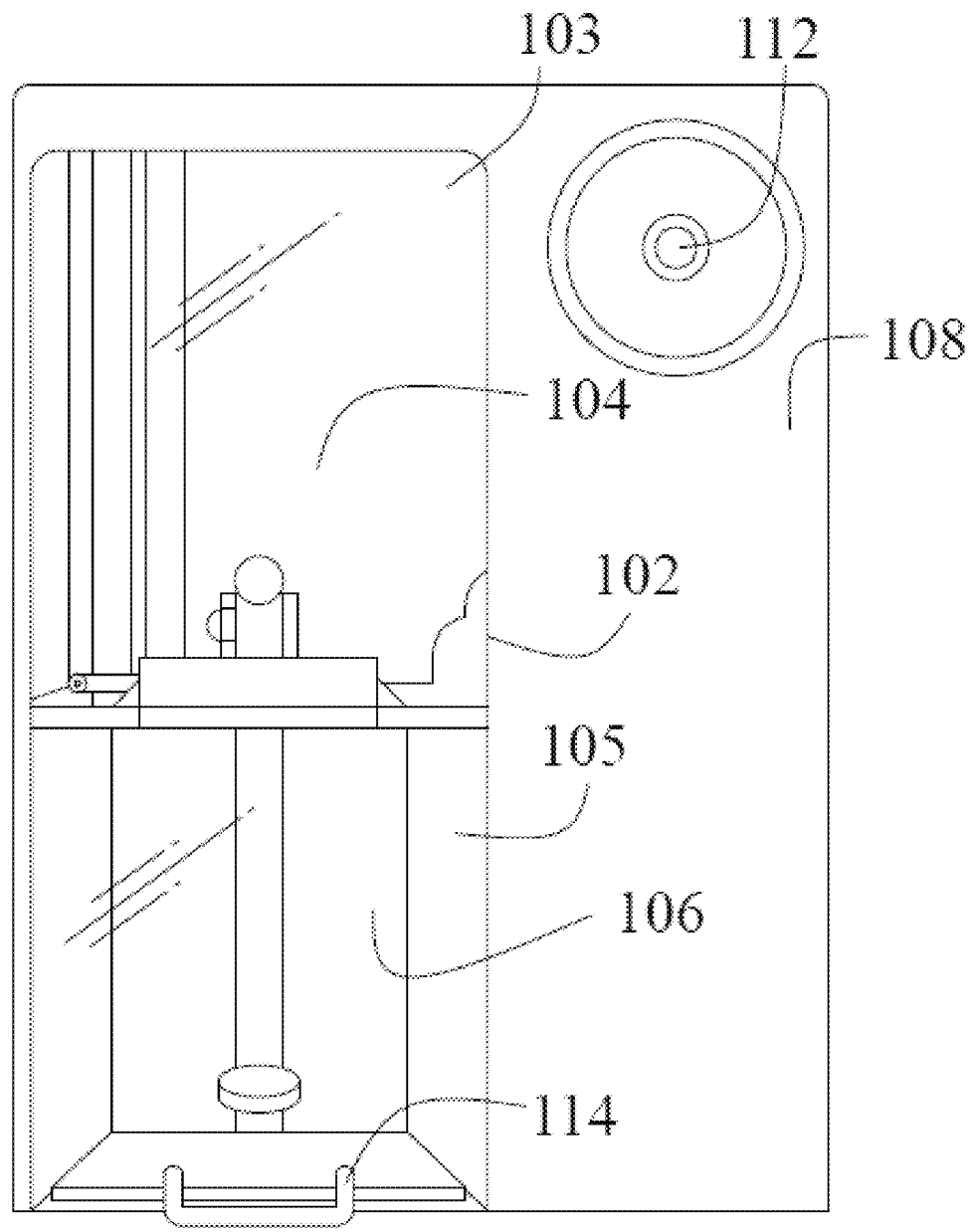
FIG. 7 Depicts a perspective view of a portion of front surface 108 of confections dispenser 100, showing first and second access doors 104, 106 (clear for illustrative purposes) in a closed position.

In one aspect, first and second inner layers 125, 126 are welded together using heat, RF welding, or other conventional means to form the reservoir 121. As shown in FIGS. 4 & 5, fitment 124 is boat-shaped in one aspect. In one aspect, the fitment is made from the same material as inner layers 125, 126 of pouch 120 so welding is facilitated.

Figure 3:
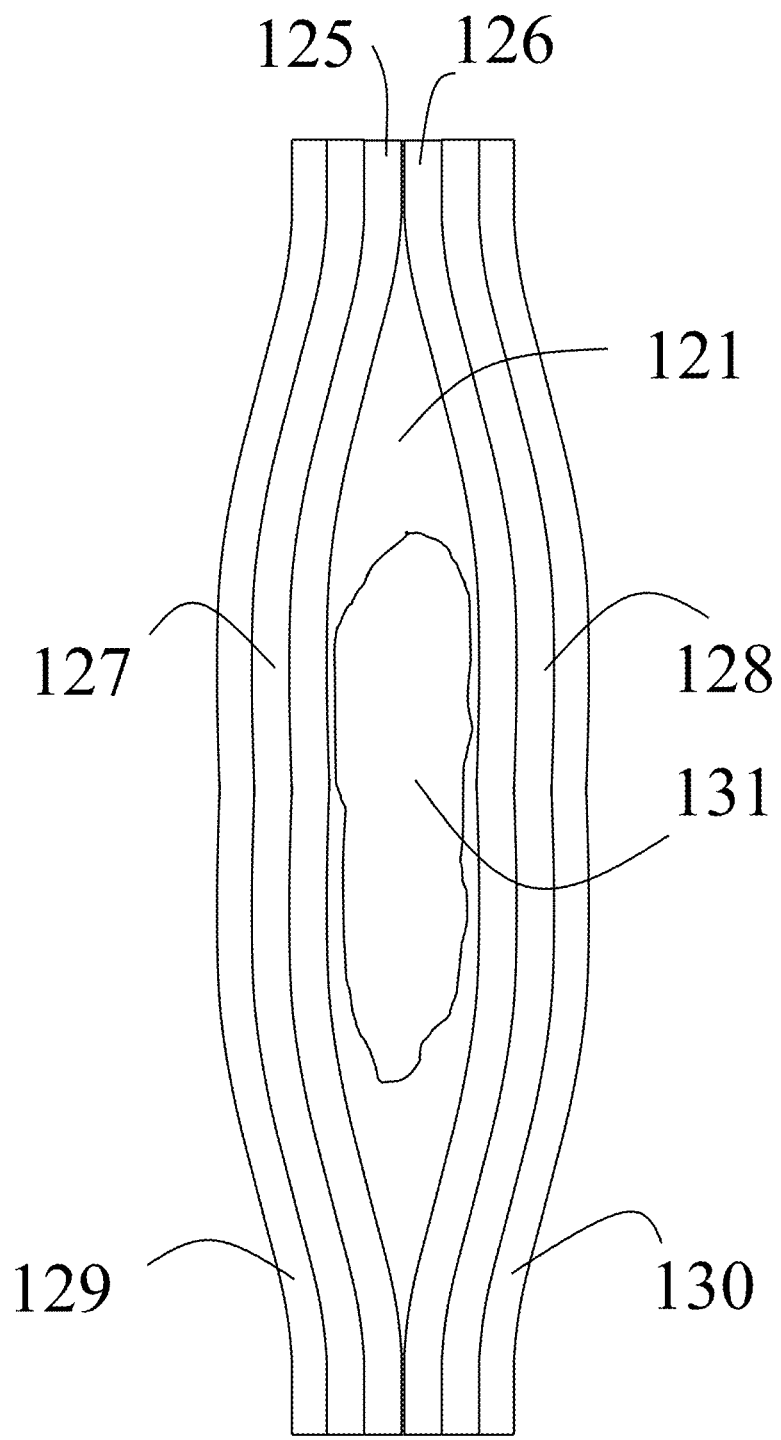
FIG. 3 depicts a cross sectional view of a multi-layered pouch design in one aspect (fitment 124 omitted for illustrative purposes) (not to scale).

FIG. 3 depicts a multi-layered design in one aspect. It should be noted that fitment 124 is omitted for illustrative purposes, but the multi-layered design is formed around fitment 124 for actual use. In one aspect, a pre-bagged soft ice cream (or sherbet, or the like) pouch (aka bag), stored (with opening 122 facing upwards) in a separate refrigerated unit, is used.

The fitment 124 includes an opening which defines an opening 122 in the reservoir 121. First and second inner layers 125, 126 are attached to fitment 124 to create a reservoir. In one aspect (e.g. FIG. 4), opening 122 extends through dispensing nozzle 136 which, as shown in FIG. 4, is a seven-pointed star. Cap 119 is adapted for nozzle 136. The opening 122 can have other shapes, including round, or ovoid. In one aspect, dispensing nozzle is omitted and opening 122 in fitment 124 is covered with removable cover such as a foil seal that is heat sealed to the fitment. This has the advantage of less wasted product in the nozzle.

In one aspect, a confections dispenser 100 comprises: an access port 102 disposed in a front surface 108 of the confections dispenser; first and second access doors 104, 106, configured to slidingly and cooperatively move relative to the access port 102; a nest assembly 150 disposed in a bottom portion 157 of the upper portion 103 of access port 102; a pinch roller assembly 140 disposed proximate an upper portion 103 of access port 102, the pinch roller assembly 140 having a pair of opposing pinch rollers 141 operative to grip upper edge 137 of the pouch 120; a cone transport mechanism 117 disposed in a lower portion 105 of the access port 102, and a cone holder 116 operatively connected to the cone transport mechanism 117.

As shown in FIG. 1, the pinch roller assembly 140 is in an upward position. In this position, it is above upper portion 103 of access port 102. The pinch roller assembly 140 is configured to travel downwardly, and becomes visible in upper portion 103 of access port 102.

The first and second access doors 104, 106 are configured to slidingly and cooperatively move relative to the access port 102. In another embodiment (not shown), first and second access doors each move slidingly sideways to expose the access port 102. In another embodiment (not shown), first and second access doors are hinged. In one aspect, the second access door 106 has a handle 114 attached to a bottom portion thereof.

The access port is configured to receive the pouch 120 as described and claimed herein. In a closed position, the first access door 104 covers an upper portion 103 of the access port, and the second access door 106 covers a lower portion 105 of the access port. Thus, the access port is covered in such a manner as to prevent a user from gaining access therethrough.

Figure 8:
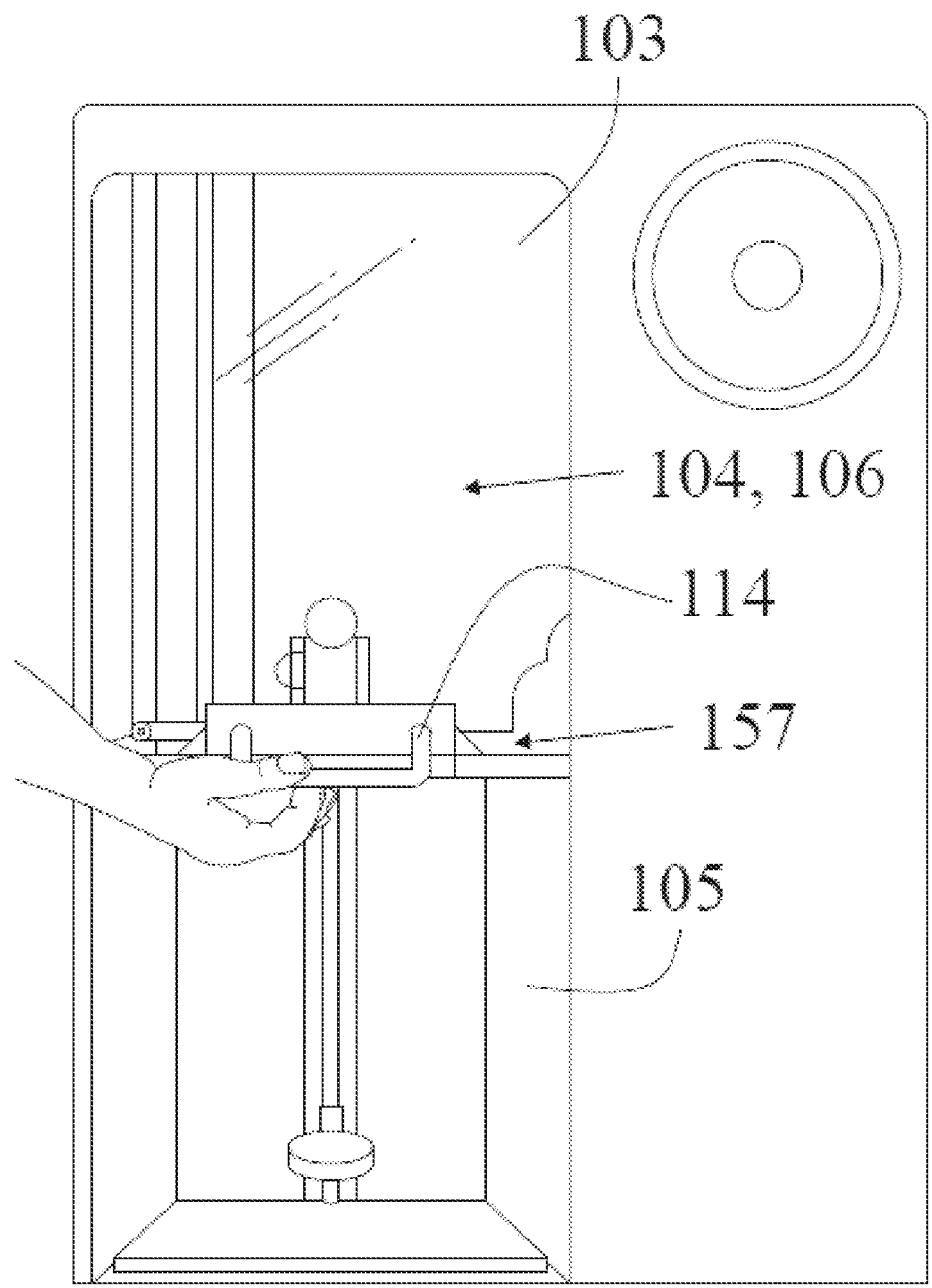
FIG. 8 Depicts a perspective view of a portion of front surface 108 of confections dispenser 100, showing first and second access doors 104, 106 (clear for illustrative purposes) in a first open position.
Figure 9:
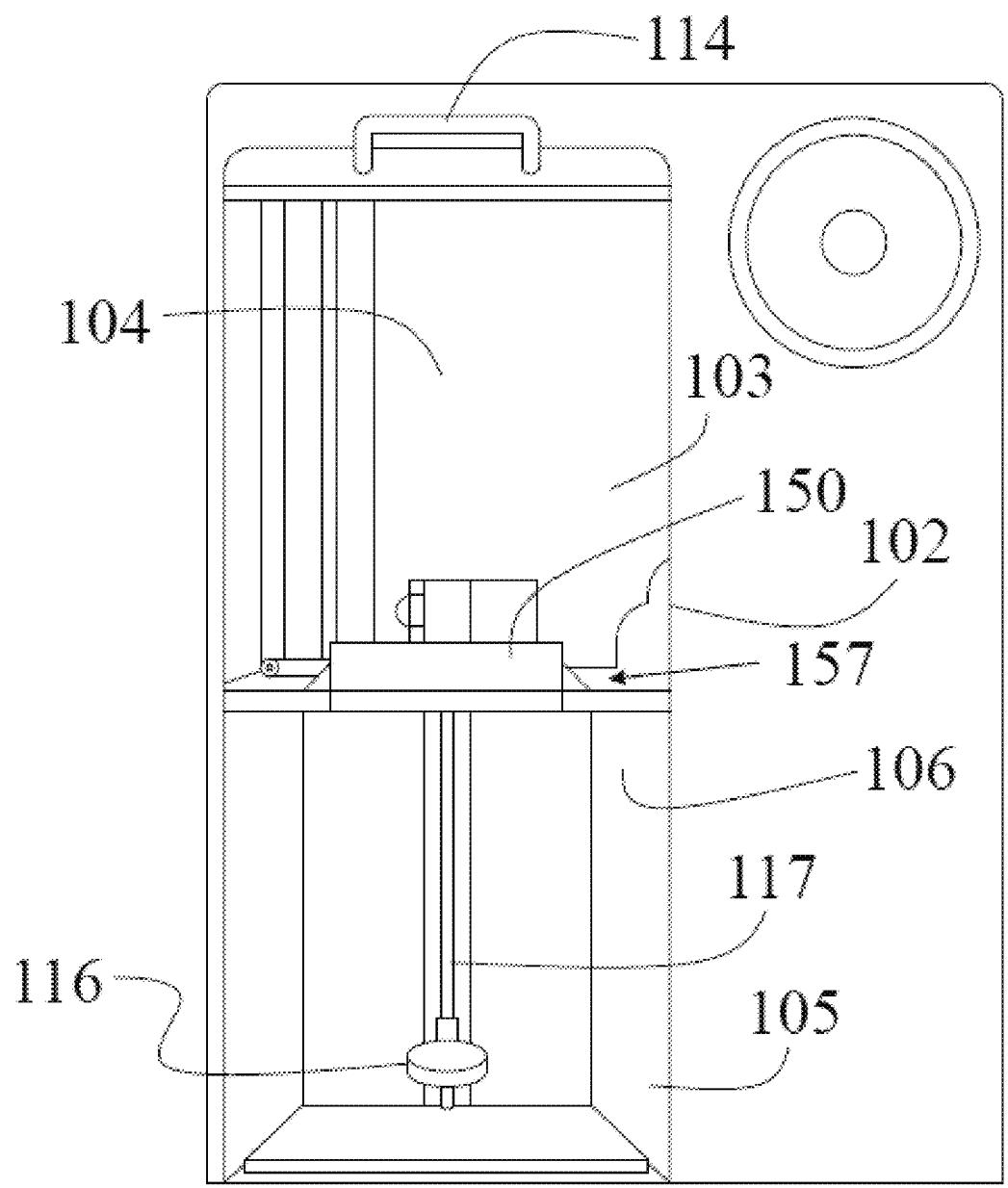
FIG. 9 Depicts a perspective view of a portion of front surface 108 of confections dispenser 100, showing first and second access doors 104, 106 in a second open position.

As shown in FIGS. 8 & 9, a user engages and moves handle 114 upwardly from the closed position. In a first open position (FIG. 8), the handle 114 is proximate the middle of the access port, the lower portion 105 of the access port 102 is uncovered, and first and second access doors 104, 106 coincide to cover the upper portion 103 of the access port 102, whereby a user may access the lower portion 105 of the access port to place a cone (or cup) 123 in the cone (or cup) holder 116.

In a second open position, first and second access doors 104, 106 are located above the access port 102 to entirely expose the access port 102. As depicted in FIG. 9, handle 114 is at the top of access port 102, and first and second access doors 104, 106 are located above access the port 102.

The first and second access doors 104, 106 are configured to slidingly and cooperatively move between a closed position, to a first open position, and then to a second open position. In moving from the first to the second open position, the second access door 106 is adapted to engage the first access door so that both doors are moved as the user engages handle 114 to move both doors all the way up so as to expose access port 102. This engagement can be accomplished in various ways. For example, in one aspect of the subject technology the first access door 104 has a protruding portion that will be engaged by the upper edge of the second access door 106 as it travels upwardly. In another aspect, the second access door 106 has the protruding member. The first and second access doors 104, 106 are configured to slidingly and cooperatively move from the second open position, through the first open position, and then to a closed position, such that the movement of handle 114 causes to doors to interact with each other accordingly.

First and second grippers 151, 152, are configured to grip the fitment 124 of the pouch 120 when the grippers are in a closed position. A nest assembly 150 comprises, a first gripper 151 slidable along two rails 153, and driven by screw drive 154 to move first gripper 151 towards a second gripper 152 to effectively clamp fitment 124 of pouch 120. In one aspect, second gripper 152 is moveable and actuated by screw drive 154. In another aspect, it is stationary. Harness 155 holds rails 153 and screw drive 154. First and second grippers 151, 152 are shaped to form an opening that is aligned with opening 122 in pouch 120 to accomplish squeezing product from the pouch when the fitment 124 is held between first and second grippers 151, 152.

The pinch roller assembly 140 comprises a pair of opposing pinch rollers 141 that are operative to grip upper edge 137 of the pouch 120, and to move the pinch roller assembly relative to the pouch 120 (or vice versa in other aspects). In one aspect, pinch rollers 141 are moveable while pouch 120 is fixed by virtue of being restrained by first and second grippers 151, 152 of nest assembly 150.

Two important factors for operatively gripping the pouch are the amount of force exerted on the pouch and the amount of friction on the pouch. The amount of force is accomplished by spacing the pinch rollers apart such that the distance between the rollers is relatively smaller than the thickness of the pouch. For simplicity, FIG. 10 omits a multi-layer topology of the pouch, but it should be understood that such topology is incorporated in some aspects, and the rollers are spaced apart commensurate with the overall pouch thickness. In other aspects, the pouch design may be one layer, or two layers, or more than three layers. The choice of layer material, and number of layers is closely related to the interaction between the pouch and pinch roller operation. For example, in one aspect, the pinch rollers traverse the height of the pouch by not faster than 15 seconds. It has been discovered by thorough, non-routine experimentation, that pouch failure occurs when the pinch rollers move too fast. Accordingly, this design consideration is factored into the choice of the number of layers, and composition thereof.

Figure 11:
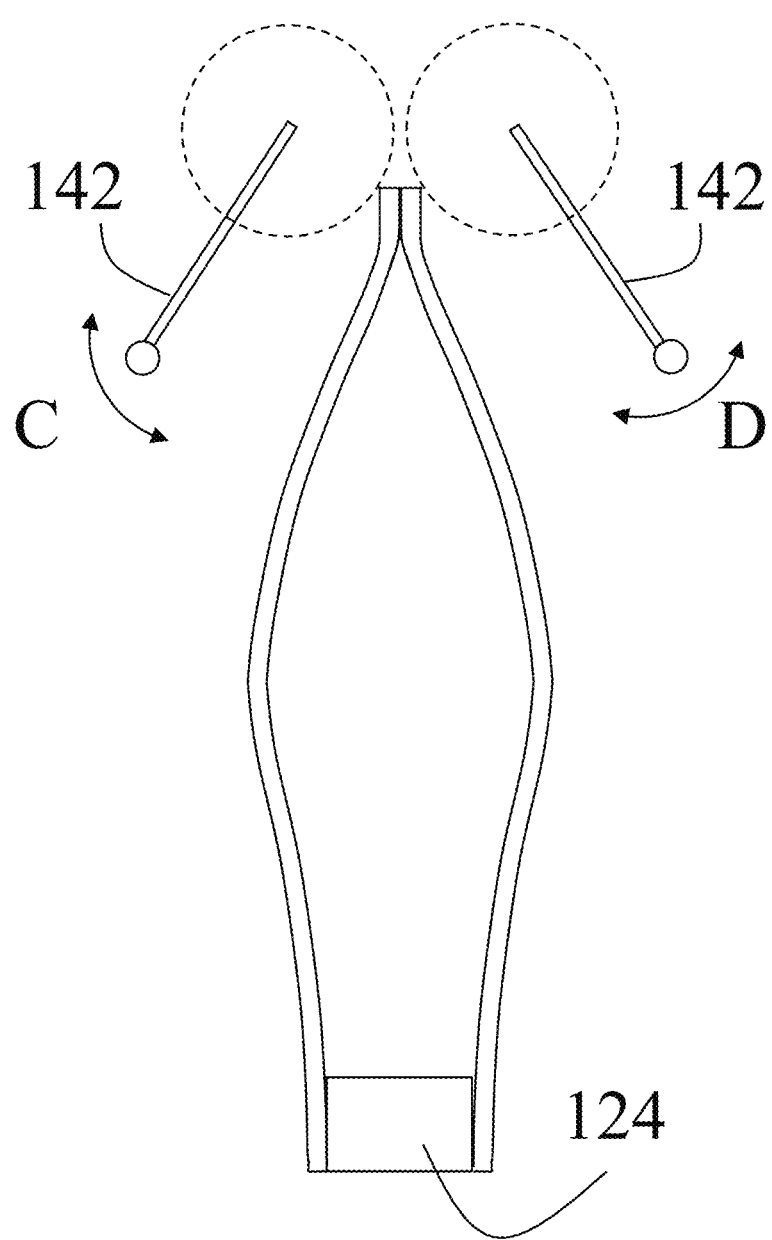
FIG. 11 Depicts a cross sectional, conceptual, view of a pinch roller, pouch, and pouch grippers 142 in one aspect (not to scale).
Figure 12:
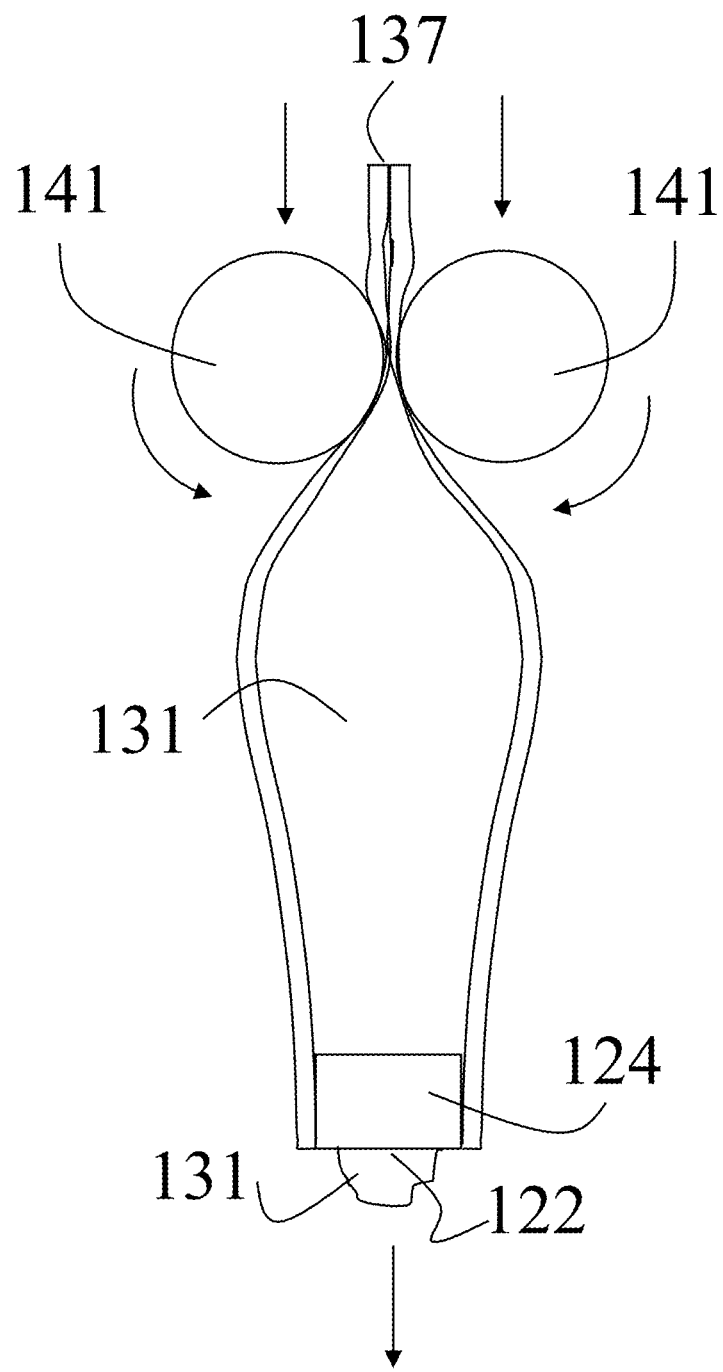
FIG. 12 Depicts a cross sectional, conceptual, view of a pinch roller and pouch in one aspect (not to scale), as pinch rollers rotate in a forward direction to travel downward relative to the pouch, thereby squeezing material through opening 122.
Figure 13:
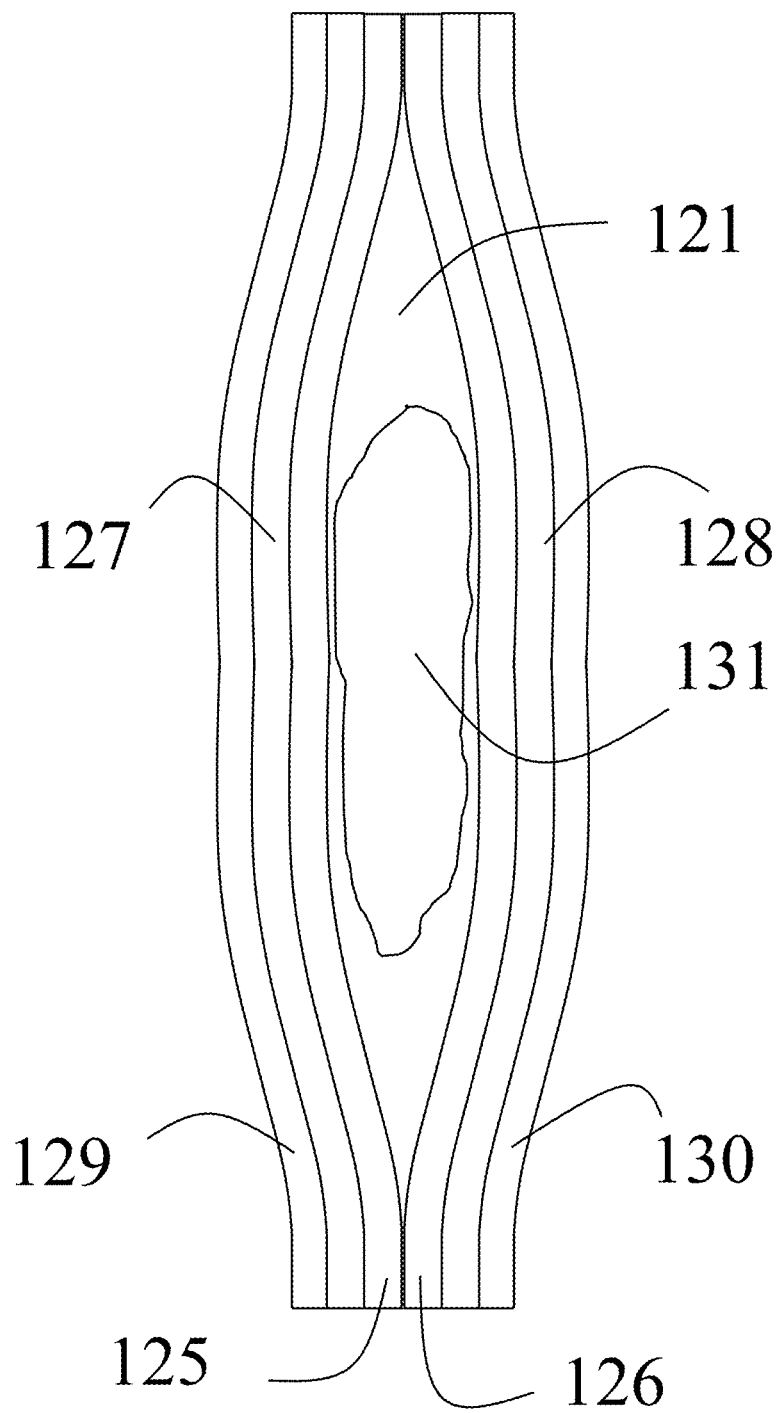
FIG. 13 Depicts a cross sectional view of a multi-layered pouch design in one aspect (fitment 124 omitted for illustrative purposes) (not to scale).

As shown in FIG. 12, pinch rollers 141 rotate in the direction of arrows shown which causes the rollers to move relative to pouch 120 in the direction of the downward arrows shown (i.e. forward direction), to effectively squeeze material 131 through opening 122 of fitment 124. As shown in FIG. 11, pouch grippers (aka sweep arms) 142, bidirectionally rotate in the direction of arrows C & D, about an axis common to respective pinch rollers 141, and are operable to grip pouch 120. In other aspects (not shown), pouch grippers 142, bidirectionally rotate in the direction of arrows C & D, about an axis that is not common to respective pinch rollers 141. The pouch grippers 142 are helpful to ensure that pouch 120 is positioned so as to be properly engaged by pinch rollers 141 as they are lowered into position. In one aspect, opposing pinch rollers 141 are spaced apart at a fixed position which has a cost advantage relative to pinch rollers that are moveable with respect to each other. In other aspects, the pinch rollers are moveable and capable of being adjusted to grip pouch 120.

The cone holder 116 is adapted to hold a cone or cup 123. The user can select a variety of cone sizes, or a cup, instead of a cone. The cone holder 116 can be adapted to hold varying cone and cup sizes. In one aspect, cone holder 116 has a 1.52" opening to accommodate standard cups, such as Joy #22 or 30.

In one aspect (FIG. 20), a confections dispensing method comprises:

A user selects 200 the confections pouch 120; according to flavor, etc from a remote refrigerated display case;

then the user selects 201 a cone 123 (or cup); according to flavor, or other characteristics;

then the user moves 202 the handle 114 of the second access door 106 of the confections dispenser 100 from a closed position to a first open position;

then the user places 203 the selected cone 123 into the cone holder 116 of the confections dispenser 100;

then the user lifts 204 the handle 114 thereby moving first and second access doors 104, 106 to a second open position (it should be noted that the handle 114 could be moved directly from the closed position to the second open position and that first and second access doors 104, 106 would engage in the first open position such that they would travel together upwardly to the second open position);

then the user places 205 the selected confections pouch 120, with cap 119 removed, into nest assembly 150, making sure that the fitment 124 is properly seated between first and second grippers 151, 152 (it should be noted that the selection and placement of the cone and pouch does not necessarily have to be accomplished in the stated order so long as the cone and pouch are properly inserted in the prescribed manner before pushing actuation button 112 in a subsequent step);

then the user moves 206 the handle 114 of the confections dispenser 100 from the second open position to the closed position (in one aspect, the operation will not initiate unless the handle, and hence the doors, are in the closed position);

then the user pushes 207 actuation button 112 of the confections dispenser 100, thereby initiating an automated sequence in one aspect (that in one aspect, will not commence until the cone and pouch are properly placed);

then first and second grippers 151, 152 are closed 208 to operatively grip or restrain fitment 124 (in one aspect, the grippers will not properly engage a pouch having a non-matching fitment);

then pinch roller assembly 140 moves 209 downwardly from a starting position, by a pre-defined distance, towards pouch 120, the pre-defined distance corresponding to upper edge 137 of pouch 120;

then cone holder 116 moves 210 upwardly along cone transport mechanism 117 towards pouch 120, the movement of cone holder 116 is synchronized so that it stops movement as cone 123 is just below opening 122 in pouch 120 (cone transport mechanism 117 can be any suitable linear transport);

then pouch grippers 142 are closed 211 at a pre-defined position so as to grip upper edge 137 of pouch 120, prior to pinch roller assembly 140 engaging pouch 120 (it should be noted that pouch grippers can be opened on the way down or alternatively they could have been placed in an open position initially, the closing is timed to grip the pouch when the pouch grippers are in position);

then pinch roller assembly 140 engages/grips 212 the upper edge 137 of pouch 120, the pinch rollers being rotated in a forward direction, so as to cause the pinch roller to be downwardly moved relative to pouch 120, as confections material 131 is gradually squeezed out of opening 122 (it should be noted that pinch roller rotation entails the pinch rollers rotating in a cooperating manner, opposite to each other to either move downwardly (forward rotation) towards the pouch, or upwardly (backward rotation) away from the pouch);

then pouch grippers 142 are opened 213 to release pouch 120 (at this point the pouch is gripped by the pinch rollers);

then cone holder 116 moves 214 downwardly along cone transport mechanism 117 away from pouch 120, the location and speed commensurate with a pre-selected fill profile of confections material 131, the movement of cone holder 116 being synchronized with the movement of pinch roller assembly 140, for desired distribution profile of confections material 131 into cone 123, as pinch rollers move downwardly and progressively squeeze more material into the cone, the cone holder 116 continues downward movement to its lowest position reached after the pinch rollers cease downward movement;

the pinch roller assembly 140 ceases 215 downward movement at a stopping position, when the pinch rollers reach the bottom of the pouch, just above fitment 124;

then pinch rollers cease forward rotation 216 (the cessation of rotation can alternatively coincide with stoppage of downward movement of pinch roller assembly 140);

then pinch roller assembly 140 moves 217 upwardly to return to the starting position, the pouch remaining between the pinch rollers during the upward movement;

then disposal chute 138 is moved 218 from a retracted position to an extended position, so as to be positioned underneath pouch 120;

then pinch rollers begin backward rotation 219 to discharge pouch 120 from pinch rollers into the disposal chute 138; the pouch sliding along disposal chute into a waste receptacle 139;

then disposal chute 138 is moved 219 to the retracted position.

As shown in FIG. 1, disposal chute 138 is in a retracted position. Disposal chute 138 is moved from a retracted position to an extended position, underneath pinch roller assembly 140 at a time when pouch 120, which is mostly empty and held between pinch rollers 141, is in an upward position, above disposal chute 138. When pinch rollers are moved in a reverse direction, pouch 120 is ejected from between the pinch rollers and falls onto disposal chute 138 where it slides down the disposal chute into waste receptacle 139. The disposal chute 138 is then returned to the retracted position.

In one aspect of the subject technology, the confections dispenser is powered by 120V AC power, with outer dimensions (viewed from the front) to be 18" wide×18" deep×36" tall. In one aspect, the dimensions are 18" wide×19.35" deep×36.35" high. In one aspect, the access port 102 is 9" wide.

Figure 14:
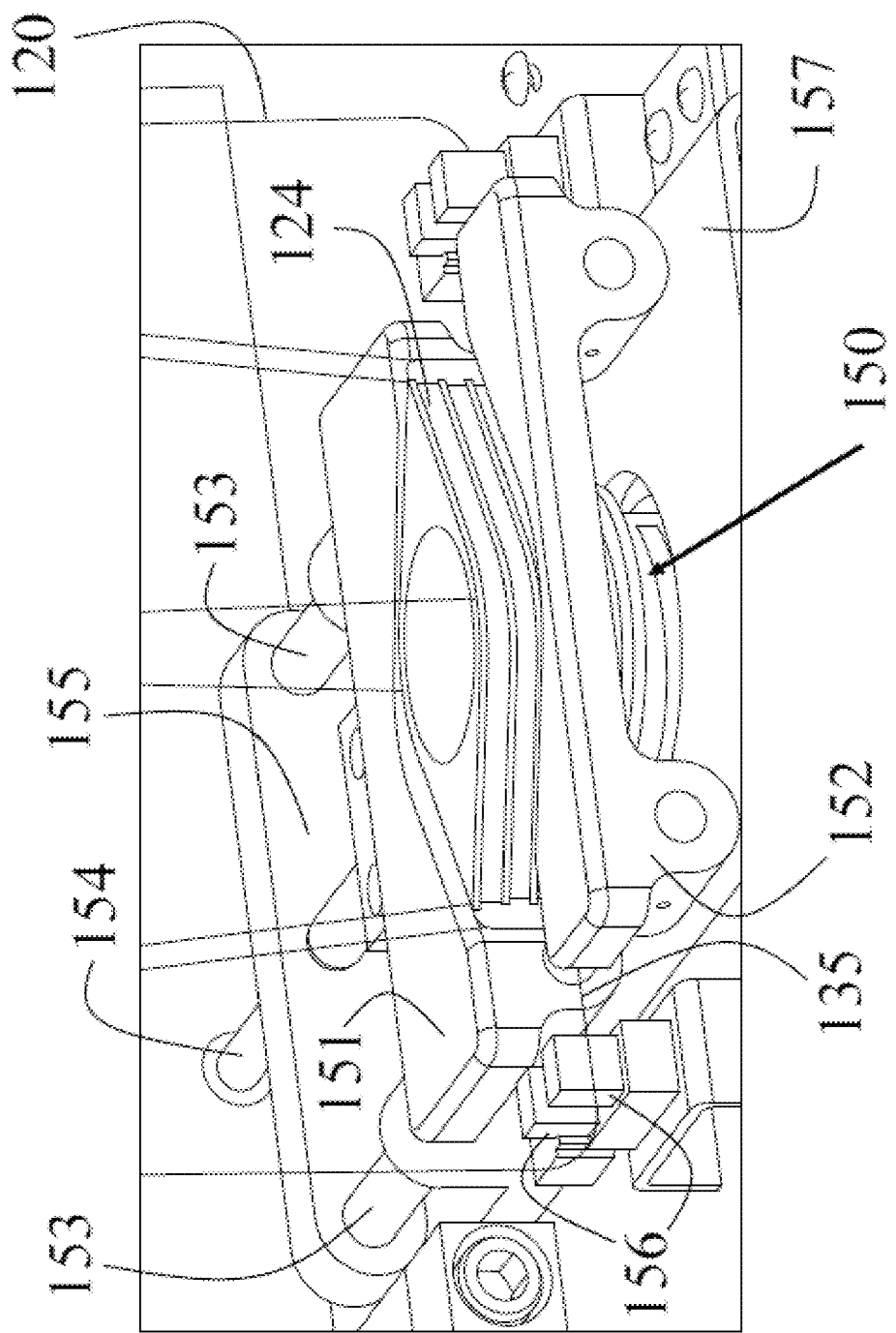
FIG. 14 Depicts a perspective view of nest assembly 150.
Figure 15:
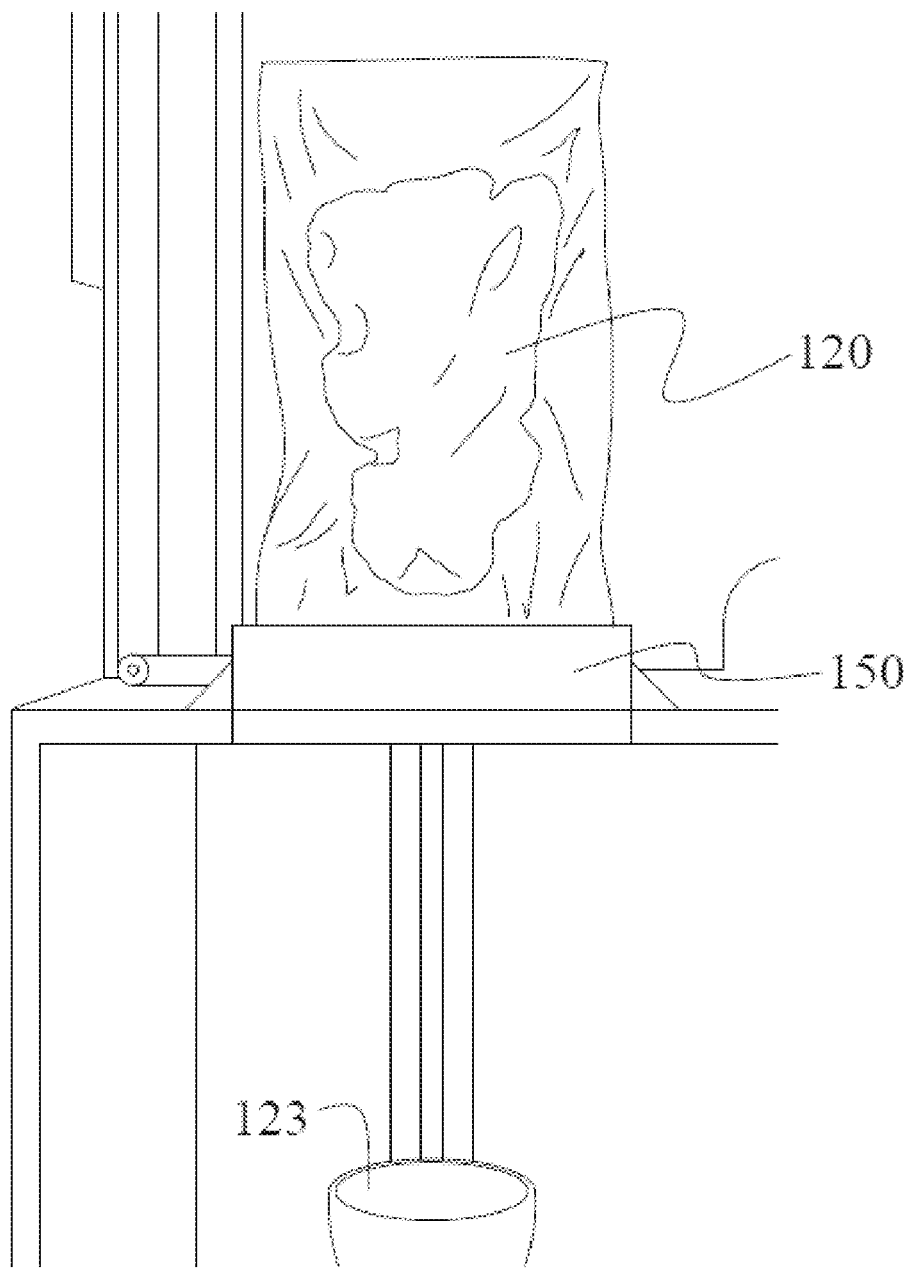
FIG. 15 Depicts a perspective view of confections dispenser 100 during operation with the pouch inserted into the grippers and the cone inserted into the cone holder.
Figure 16:
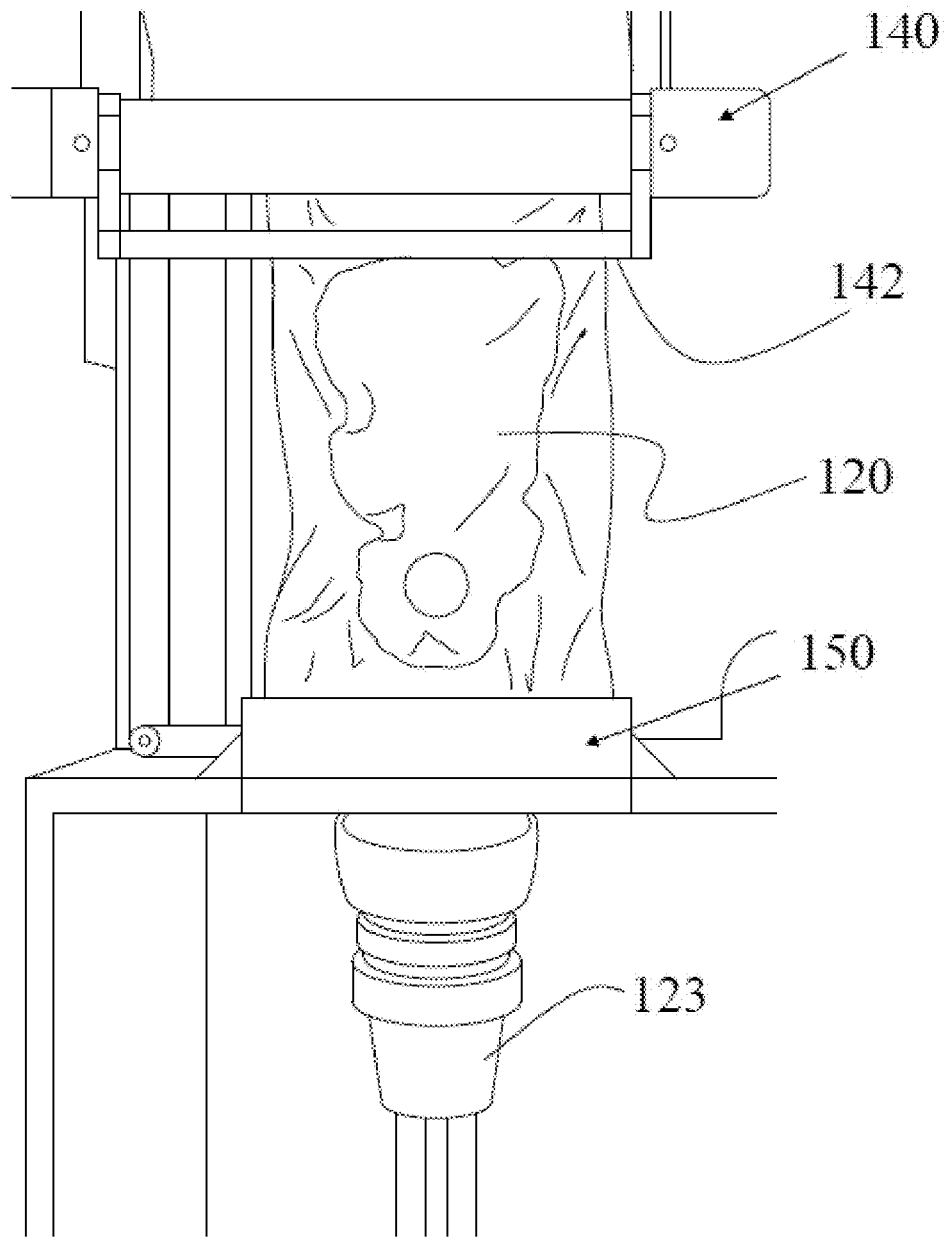
FIG. 16 Depicts a perspective view of confections dispenser 100 during operation, as the pouch grippers engage the pouch.
Figure 17:
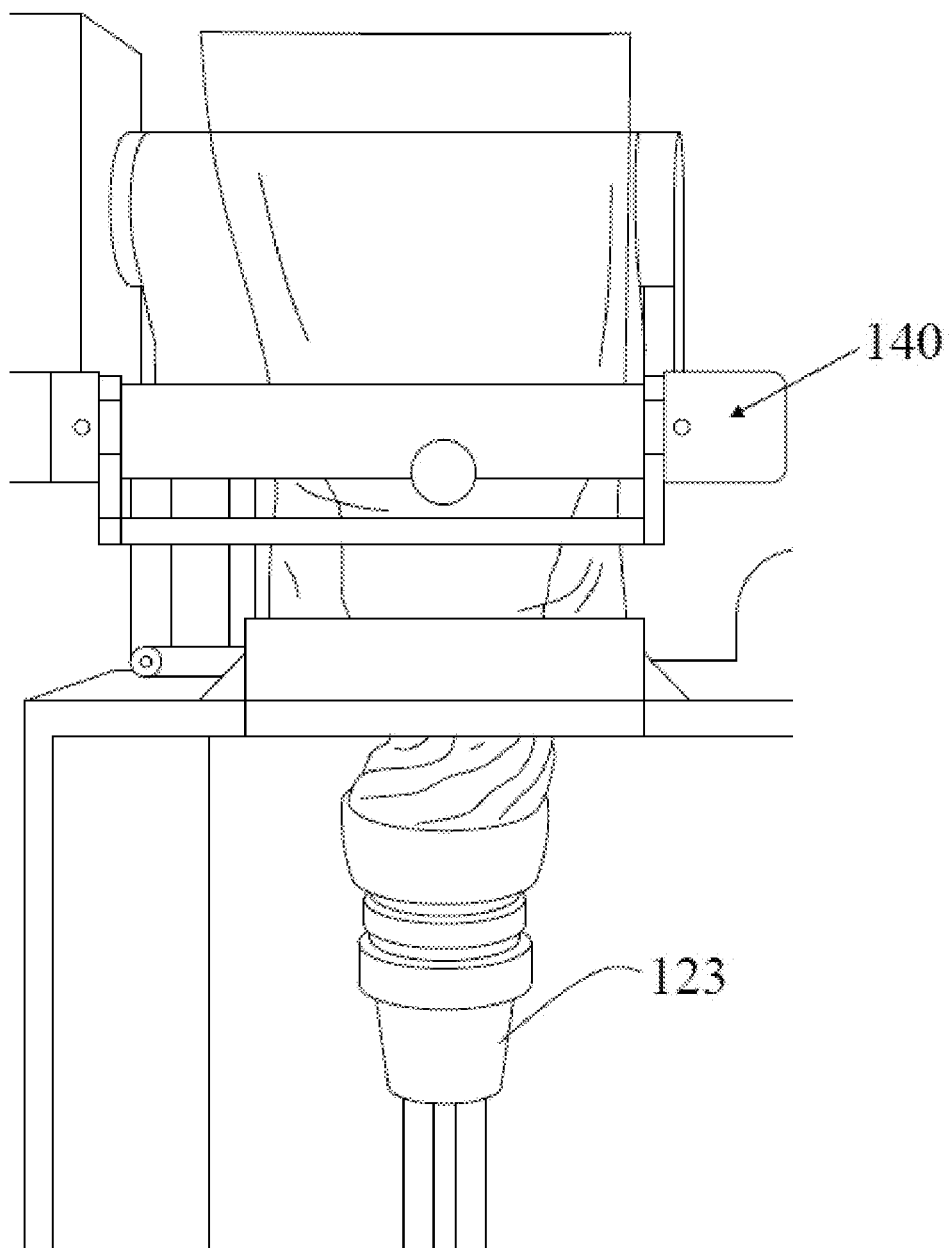
FIG. 17 Depicts a perspective view of confections dispenser 100 during operation, as the pinch roller assembly descends downwardly and squeezes material into the cone.
Figure 18:
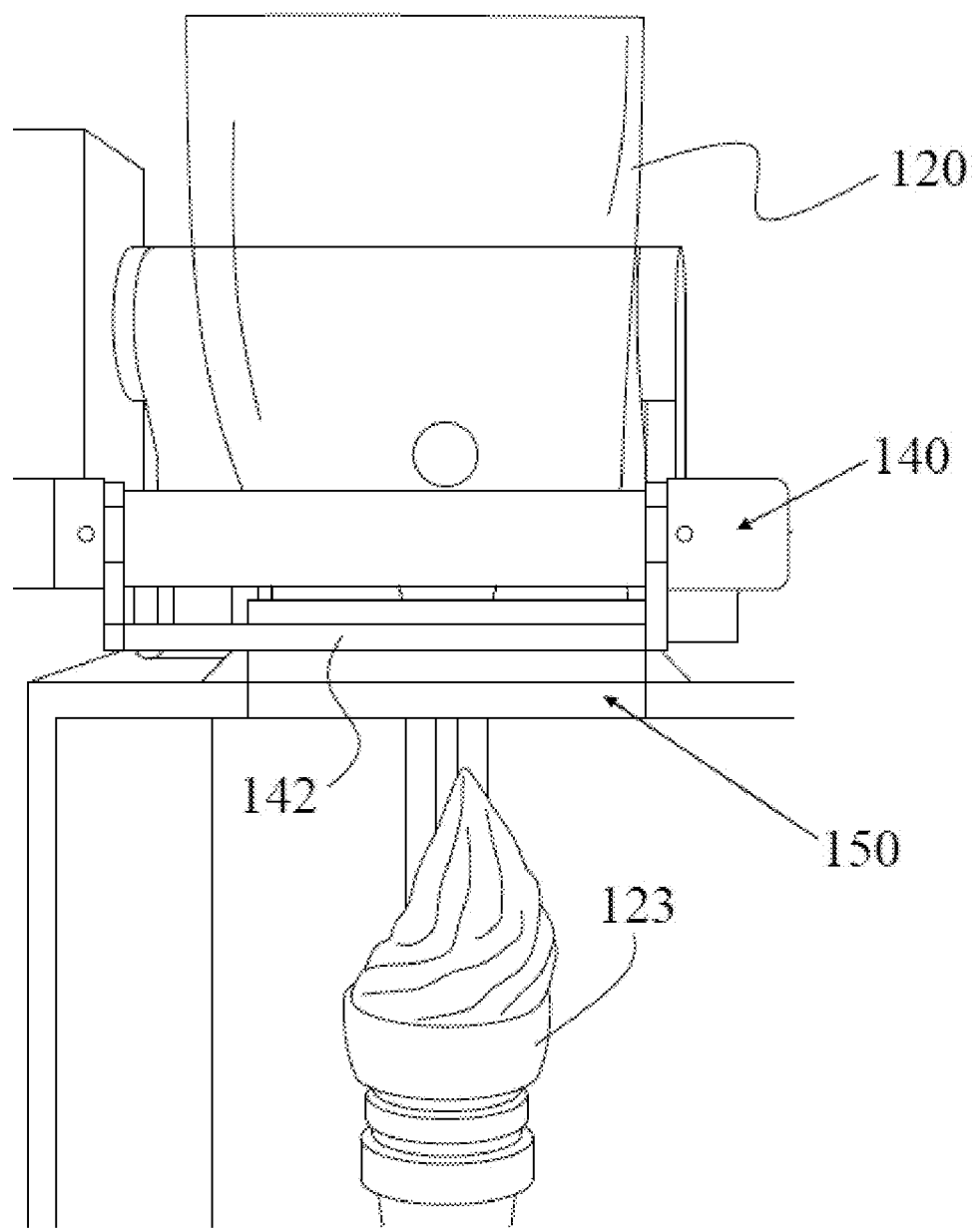
FIG. 18 Depicts a perspective view of confections dispenser 100 during operation, as the cone filling has been completed.
Figure 19:
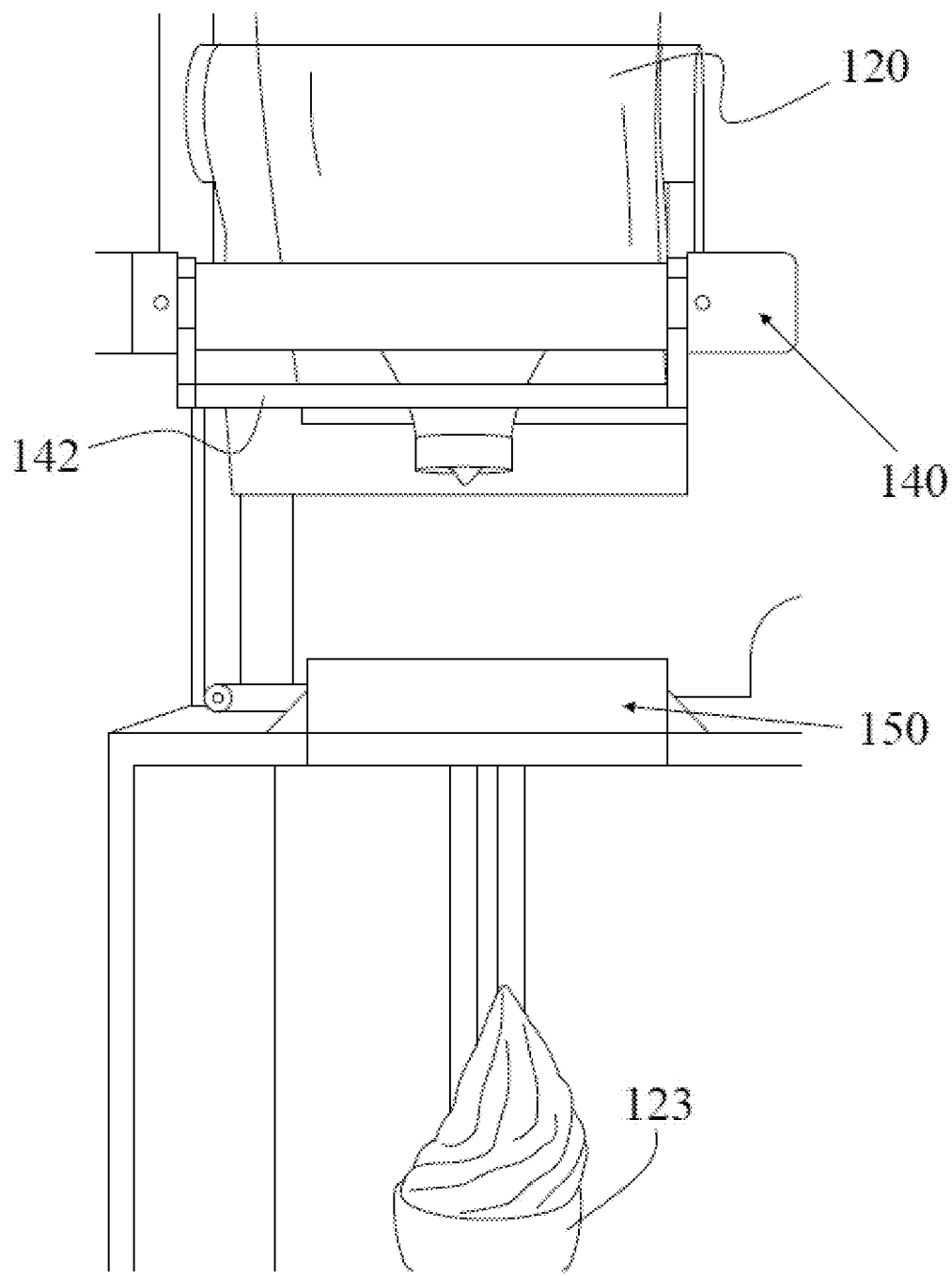
FIG. 19 Depicts a perspective view of confections dispenser 100 during operation, as the pinch roller assembly travels upwardly with the pouch held between the non-rotating pinch rollers.

In one aspect, the system is configured to only accept a certain pouch (with the cap 119 removed). This can be accomplished for example wherein a pouch nest (aka first and second grippers 151, 152), are configured to the exact shape of the fitment 124, so that first and second grippers 151, 152 will not properly engage with the fitment 124. Sensors 156 (FIG. 14) will not indicate a successful mating of fitment 124 and first and second grippers 151, 152. For example, sensors 156 are optical sensors (aka photo eyes) in one aspect which will detect only when bottom portion 135 of pouch 120 is between the sensors, and this will only happen when fitment 124 is properly seated between first and second grippers 151, 152. In one aspect, the system is configured such that a pouch with cap 119 will not fit between the grippers 151, 152 (i.e. the cap must be removed).

Figure 10:
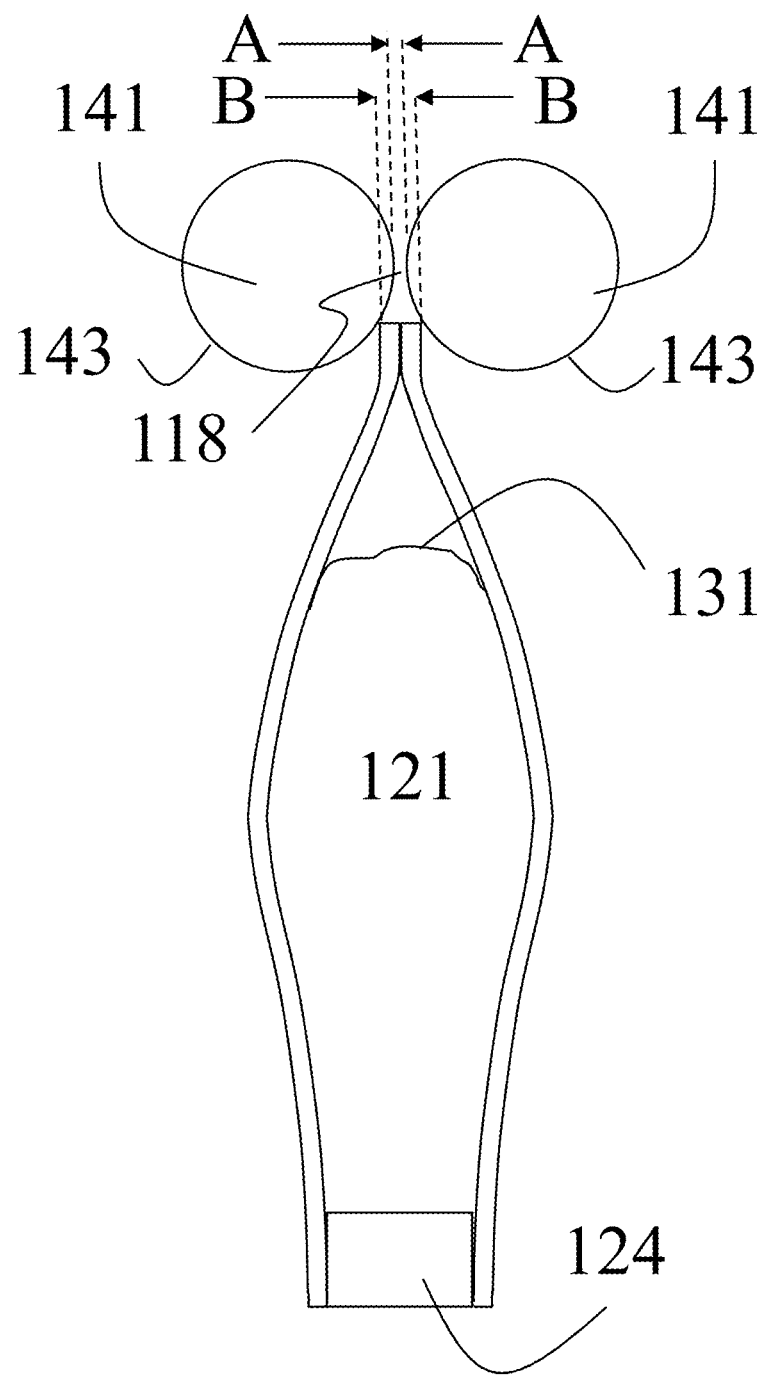
FIG. 10 Depicts a cross sectional, conceptual, view of a pinch roller and pouch in one aspect (not to scale).

In one aspect, the pinch rollers 141 are spaced apart at a fixed distance A which is smaller than a thickness B of pouch 120. As shown in FIG. 10, distance A represents the distance between pinch rollers 141, and distance B represents the width of pouch 120 at the upper edge 137 thereof. In one aspect, distance A (aka pouch receiver slot 118) is in a range of from 0.003" to 0.006". The pouch receiver slot 118 is sized commensurate with the overall pouch thickness, so as to vary the amount of force and friction that is applied to pouch 120.

In one aspect, the pinch rollers 141 are rotated in a forward direction at 9 RPM, which equates to a 15 second duration of downward movement of pinch roller assembly 140 from the upper edge 137 of pouch 120 to just above the fitment 124 of pouch 120. The movement of cone 116 along cone transport mechanism 117 is synchronized with this movement such that confections material 131 is dispensed into cone 116 according to a pre-selected fill profile.

In one aspect, a pre-selected fill profile of confections material 131 into cone 123 is accomplished not linearly but rather incrementally, to ensure that the bottom of the cone is sufficiently packed. Accordingly, the cone does not move at first even though the pinch roller assembly is moving, so the bottom of the cone can be more tightly packed. Specific profiles are possible to cause a different shape of dispensed material.

Pinch rollers having a 1.25-inch diameter leave behind average of 1.08 fluid oz. of product. This is so because the pinch rollers cannot completely remove all material from the pouch. Varying the outer diameter of the pinch rollers affects the amount of lost product. Accordingly, in one aspect, pinch rollers having 1.075" diameter are used. In one aspect, pinch rollers 141 have an outer diameter of 1.075" across the peaks of a knurled outer surface. In one aspect, the pinch rollers comprise aluminum rollers with a diamond shaped knurl.

In one aspect, pouch 120 comprises three layers. It should be understood that, in some of the aspects described herein, each of the three layers consists of a first and second layer, which are used on opposing sides of a reservoir. For example, FIG. 3 depicts a three-layer design, and each of the three layers includes first and second layers 125, 126 (inner), 127, 128 (intermediate), 129, 130 (outer).

In one aspect, pouch 120 comprises three layers: first and second inner layers 125, 126 are made from polyethylene (PE), first and second intermediate layers 127, 128 are made from Biaxially Oriented Nylon Film (BON), and first and second outer layers 129, 130 are made from Polyethylene Terephthalate (PET). Using PE as the inner layer in combination with a fitment 124 also made from PE is advantageous because the materials are more easily welded together.

Figure 2:
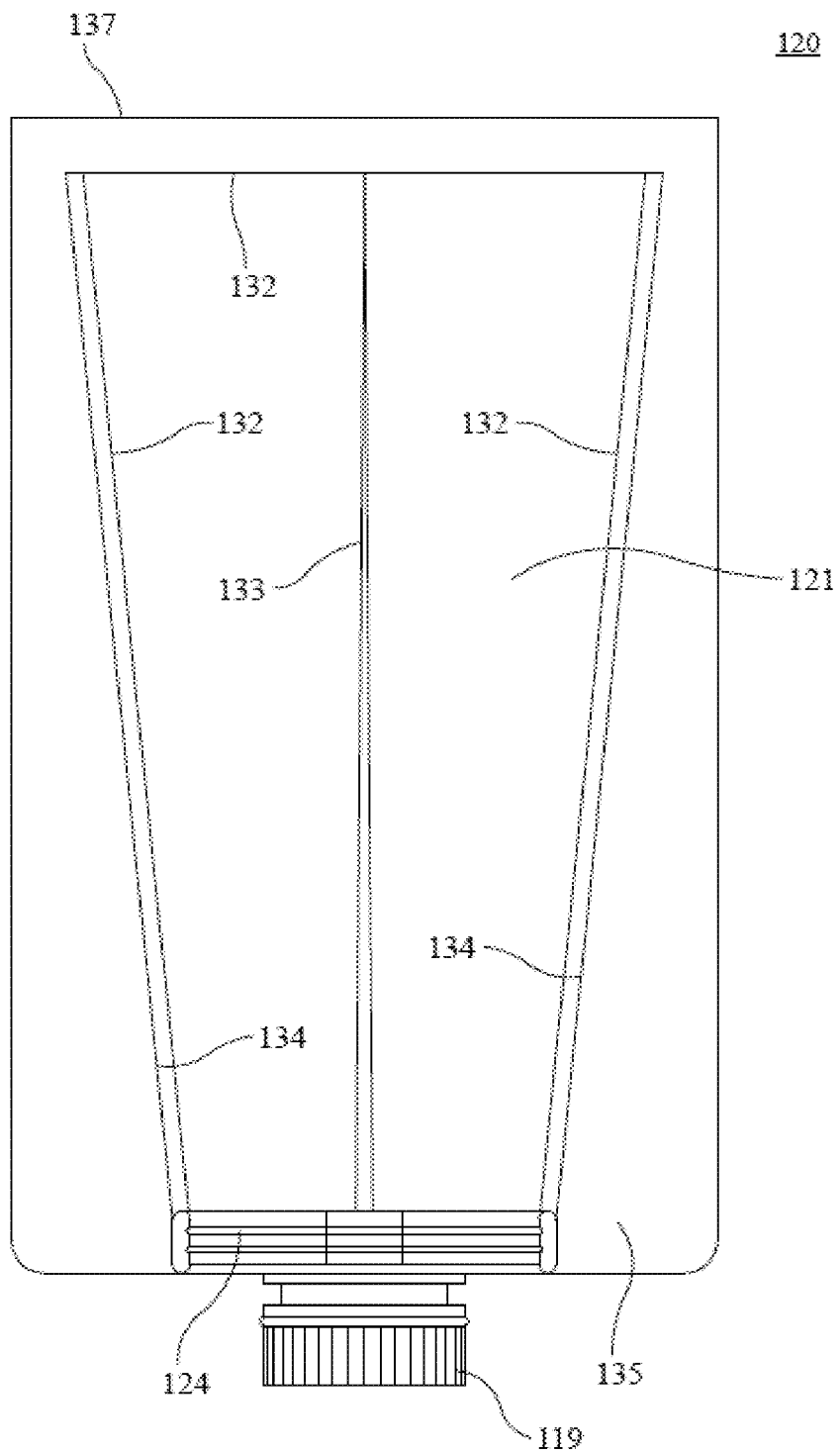
FIG. 2 Depicts a front view of pouch 120 in one aspect of the subject technology.

In one aspect, pouch 120 is 121 mm wide×196.5 mm long, and reservoir 121 is formed within the pouch with tapered sides. As shown in FIG. 2, tapered sides 134 are sized proportional to the width of fitment 124 and pouch width. The taper is smaller near bottom portion 135, and begins at the edge of fitment 124 as shown in FIG. 2, and gradually increases towards upper edge 137, the tapered side terminating near the outside of the pouch, but not too close to increase the risk of pouch failure. In one aspect, a distance of not less than 10 mm from the sides of the pouch is used. In one aspect, reservoir 121 of pouch 120 has a 9 fluid ounce capacity. In one aspect, the pouch can hold up to 10 oz of sherbet.

Test Results: FIGS. 21 through 28, using pinch rollers having an outer dimension of 1.25".

FIGS. 21 & 22 "Heavy Duty" pouch: first and second inner layers 125, 126: 130 gauge (5 mil, 127 micron (μm), 0.005") PE; first and second intermediate layers 127, 128: 60 gauge (0.6 mil, 15.24 μm, 0.0006") BON; first and second outer layers 129, 130: 48 gauge (0.48 mil, 12.2 μm, 0.00048") PET; pouch total thickness 0.0061 inches. The "Heavy Duty" pouch is identified as 48-60-130 PET-BON-PE, respectively (aka 48-60-5 (gauge, gauge, mil) PET-BON-PE. "Heavy Duty" pouch Machine set-up: Roller no-load down speed set at 12 seconds, Peak applied torque limited to 12.5%, Product temps held at −1° F. to +1° F., 50%. fail rate due to failed fitment ribs and seam tearing along top edge of fitment.

FIGS. 23 & 24 "Extra Heavy Duty" pouch: first and second inner layers 125, 126: 450 gauge (4.5 mil, 114.3 micron (μm), 0.0045") PE; first and second intermediate layers 127, 128: 100 gauge (1 mil, 25.4 micron (μm), 0.001") BON; first and second outer layers 129, 130: 48 gauge (0.48 mil, 12.2 micron (μm), 0.00048") PET; pouch total thickness 0.006 inches. "Extra Heavy Duty" pouch Machine set-up: Roller no-load down speed set at 12 seconds, Peak applied torque limited to 12.5%, Product temps held at −2° F. to +1° F. With one exception (Specimen #16): Good dispensing outcomes were had with good product consistency. Fitment weld ribs were compromised but no leaks were observed, Faults were invisible to customer (aka hypothetical customer).

FIGS. 25, 26, & 27 "Super Heavy Duty" pouch: first and second inner layers 125, 126: 500 gauge (5 mil, 127 micron (μm), 0.005") PA+PE (PA=Polyamide, a type of nylon); first and second intermediate layers 127, 128: 100 gauge (1 mil, 25.4 micron (μm), 0.001") BON; first and second outer layers 129, 130: 48 gauge (0.48 mil, 12.2 micron (μm), 0.00048") PET; pouch total thickness 0.0065 inches. "Super Heavy Duty" pouch called out as 48-1-5 PET-BON-PA+PE, respectively. Test specimens #1 thru #3 (omitted from FIG. 27) were below 0° F. and too cold to dispense thru nozzle. With machine no-load down speed set at 9 seconds: Temps above 5° F. produced a product that seems borderline too soft; Temps below 5° F. yielded good consistency product; Temps below 5° F. wrought havoc on fitment rib welds and caused one burst side wall and two corner tears. Machine set-up with: Roller no-load down speed set at 12 seconds, Peak applied torque limited to 12.5%, and Product temps held at 0° F. to +1° F.: Good dispensing outcomes were had with good product consistency, Fitment weld ribs were compromised but no leaks were observed. All faults would be invisible to customer.

FIG. 28 depicts "lost product" i.e. product left in pouch. This unextracted product is thus lost and therefore should be minimized. Using a pinch roller diameter of 1.25 inch, the average volume of lost product was 1.08 fl. oz. A smaller diameter roller would be expected to reduce this loss. As a result of extensive, non-routine, experimentation, surprisingly good and unexpected results were obtained for the following characteristics: confections material 131 at a temperature of between zero and seven degrees F.; pinch rollers 141 having a knurled outer surface, and an outer diameter of 1.075", pinch rollers 141 being rotated at 9 RPM, so as to traverse downwardly along the height of pouch 120, having tapered sides, a distance of approximately 196.5 mm, during a duration of no more than 15 seconds.

The invention is in no way limited to the specifics of any particular embodiments and examples disclosed herein. For example, the terms "aspect," "example," "preferably," "alternatively," and the like denote features that may be preferable but not essential to include in some embodiments of the invention. In addition, details illustrated or disclosed with respect to any one aspect of the invention may be used with other aspects of the invention. Additional elements and/or steps may be added to various aspects of the invention and/or some disclosed elements and/or steps may be subtracted from various aspects of the invention without departing from the scope of the invention. Singular elements/steps imply plural elements/steps and vice versa. Some steps may be performed serially, in parallel, in a pipelined manner, or in different orders than disclosed herein. Many other variations are possible which remain within the content, scope, and spirit of the invention, and these variations would become clear to those skilled in the art after perusal of this application.

What is claimed is:
1. A confections dispenser comprising:
an access port disposed in a front surface of the confections dispenser, the access port being configured to receive a pouch comprising:
a reservoir formed by first and second inner layers, the reservoir being configured to hold a confections material; and
a fitment disposed in a bottom portion of the pouch;
the fitment defining an opening in the reservoir through which a confections material is dispensed;
first and second access doors being configured to slidingly and cooperatively move relative to the access port, the second access door having a handle attached to a bottom portion thereof,
wherein in a closed position, the first access door covers an upper portion of the access port, and the second access door covers a lower portion of the access port,
wherein in a first open position, the lower portion of the access port is uncovered, and the first and second access doors coincide to cover the upper portion of the access port, wherein in a second open position, the first and second access doors are located above the access the port to entirely expose the access port;

a nest assembly disposed in a bottom portion of the upper portion of the access port, and further comprising,
 first and second grippers configured to grip the fitment of the pouch in a closed position;

a pinch roller assembly comprising,
 a pair of opposing pinch rollers operative to grip an upper edge of the pouch, and move the pouch relative to the pinch roller assembly;

a cone transport mechanism disposed in a lower portion of the access port;

and a cone holder operatively connected to the cone transport mechanism,
 the cone holder being adapted to hold a cone or a cup.

2. The confections dispenser of claim 1 further comprising:
 the pinch rollers being spaced apart at a fixed distance which is smaller than a thickness of the pouch of claim 1.

3. The confections dispenser of claim 1 further comprising:
 the pinch rollers having a knurled outer surface.

4. The confections dispenser of claim 1 further comprising:
 first and second pouch grippers being operative to selectively grip and release the pouch of claim 1.

5. A confections dispensing method comprising:

a user selecting a confections pouch comprising:
 a reservoir formed by first and second inner layers, the reservoir being configured to hold a confections material;
 and a fitment disposed in a bottom portion of the pouch;
 the fitment defining an opening in the reservoir through which a confections material is dispensed;

then the user selecting a cone;

then the user moving the handle of a confections dispenser from the closed position to the second open position, said confections dispenser comprising:
 an access port disposed in a front surface of the confections dispenser, the access port being configured to receive the pouch of claim 1;
 first and second access doors being configured to slidingly and cooperatively move relative to the access port, the second access door having a handle attached to a bottom portion thereof,
  wherein in a closed position, the first access door covers an upper portion of the access port, and the second access door covers a lower portion of the access port,
  wherein in a first open position, the lower portion of the access port is uncovered, and the first and second access doors coincide to cover the upper portion of the access port,
  wherein in a second open position, the first and second access doors are located above the access the port to entirely expose the access port;
 a nest assembly disposed in a bottom portion of the upper portion of the access port, and further comprising,
  first and second grippers configured to grip the fitment of the pouch in a closed position;
 a pinch roller assembly comprising,
  a pair of opposing pinch rollers operative to grip an upper edge of the pouch, and move the pouch relative to the pinch roller assembly;
 a cone transport mechanism disposed in a lower portion of the access port;
 and a cone holder operatively connected to the cone transport mechanism,
  the cone holder being adapted to hold a cone or a cup;

then the user placing the selected cone into the cone holder of the confections dispenser;

then the user placing the selected confections pouch, with the cap of said pouch removed, into the nest assembly;

then the user moving the handle of the confections dispenser from the second open position to the closed position;

then the user pushing an actuation button of the confections dispenser;

then the first and second grippers closing to operatively restrain the fitment;

then the pinch roller assembly moving downwardly from a starting position, by a pre-defined distance, towards the pouch;

then the cone holder moving upwardly along the cone transport mechanism towards the pouch;

then first and second pouch grippers closing at a pre-defined position so as to grip the upper edge of the pouch, prior to the pinch roller assembly engaging the pouch, the first and second pouch grippers being operative to selectively grip and release the pouch;

then the pinch rollers rotating in a forward direction and griping an upper edge of the pouch, the pinch roller rotation causing the pinch roller to be downwardly moved relative to pouch, whereby the confections material is gradually squeezed out of the opening of the pouch;

then the pouch grippers opening to release the pouch;

then the cone holder moving downwardly along the cone transport mechanism, away from the pouch, according to a pre-defined profile for dispensing the confections material;

then the pinch roller assembly ceasing downward movement at a stopping position, the pinch rollers being near the bottom of the pouch, just above the fitment;

then pinch rollers ceasing forward rotation;

then the pinch roller assembly moving upwardly to return to the starting position;

then the disposal chute of the confections dispenser moving from a retracted position to an extended position, underneath the pouch;

then the pinch rollers beginning backward rotation so as to discharge the pouch from the pinch rollers into the disposal chute;

then the disposal chute returning to the retracted position.

6. The confections dispensing method of claim 5 further comprising:
 the pinch rollers having a knurled outer surface, and being 1.075 inches in outer diameter, and having a forward rotation speed of 9 RPM, so as to cause the pinch roller assembly to be downwardly moved relative to the pouch, during a duration of not faster than 15 seconds;
 the pouch having tapered sides.

* * * * *